US009479450B2

(12) United States Patent
Moeller et al.

(10) Patent No.: US 9,479,450 B2
(45) Date of Patent: Oct. 25, 2016

(54) RESOLVING COMMUNICATION COLLISIONS IN A HETEROGENEOUS NETWORK

(71) Applicant: MyOmega Systems Technologies GmbH, Nuremberg (DE)

(72) Inventors: Bernd Moeller, Hefenfeld (DE); Juergen Josef Bohn, Langensendelbach (DE)

(73) Assignee: MyOmega System Technologies GmbH, Nuremberg (DE)

( * ) Notice: Subject to any disclaimer, the term of this patent is extended or adjusted under 35 U.S.C. 154(b) by 108 days.

(21) Appl. No.: 14/534,545

(22) Filed: Nov. 6, 2014

(65) Prior Publication Data
US 2015/0127823 A1 May 7, 2015

(30) Foreign Application Priority Data
Nov. 6, 2013 (EP) ..................... 13191833

(51) Int. Cl.
*H04L 12/26* (2006.01)
*H04L 12/911* (2013.01)
*H04L 12/851* (2013.01)
*H04L 12/927* (2013.01)
*H04L 1/16* (2006.01)
*H04L 1/20* (2006.01)

(52) U.S. Cl.
CPC ............. *H04L 47/70* (2013.01); *H04L 1/1607* (2013.01); *H04L 1/20* (2013.01); *H04L 43/08* (2013.01); *H04L 43/16* (2013.01); *H04L 47/24* (2013.01); *H04L 47/805* (2013.01)

(58) Field of Classification Search
USPC ....... 709/224, 225, 232, 240, 238, 234, 235, 709/241, 223
See application file for complete search history.

(56) References Cited

U.S. PATENT DOCUMENTS

| 5,720,003 | A | * | 2/1998 | Chiang | ................ | G06N 99/005 706/10 |
| 6,958,974 | B1 | * | 10/2005 | Prehofer | ................. | H04L 47/10 370/235 |
| 8,224,400 | B2 | * | 7/2012 | Dou | ..................... | H03G 3/3042 455/574 |
| 2004/0170122 | A1 | * | 9/2004 | Guo | ...................... | H04W 36/30 370/210 |
| 2004/0170191 | A1 | * | 9/2004 | Guo | .................. | H04W 36/0088 370/468 |
| 2015/0127823 | A1 | * | 5/2015 | Moeller | .................. | H04L 43/16 709/224 |

FOREIGN PATENT DOCUMENTS

JP 2009204473 A * 9/2009 ........ H04W 36/0088

* cited by examiner

*Primary Examiner* — Jude Jean Gilles
(74) *Attorney, Agent, or Firm* — MUirhead and Saturnalli, LLC

(57) ABSTRACT

Resolving heterogeneous communication collisions in a system includes measuring a quality-of service value for at least one communication connection, determining if a communication collision is reducing the quality-of-service value to below a pre-determined threshold, and, if a communication collision is reducing the quality-of-service value to below a pre-determined threshold, iteratively modifying the at least one communication connection until either a maximum number of iterations has been exceeded or the quality of service value exceeds the pre-determined threshold. Modifying the at least one communication connection includes a number of possible techniques, such as changing technology used by at least one interface corresponding to the communication connection, changing a frequency band used by at least one interface corresponding to the communication connection, changing transmission parameters used by at least one interface corresponding to the communication connection, and using transmission gaps to transmit data.

24 Claims, 7 Drawing Sheets

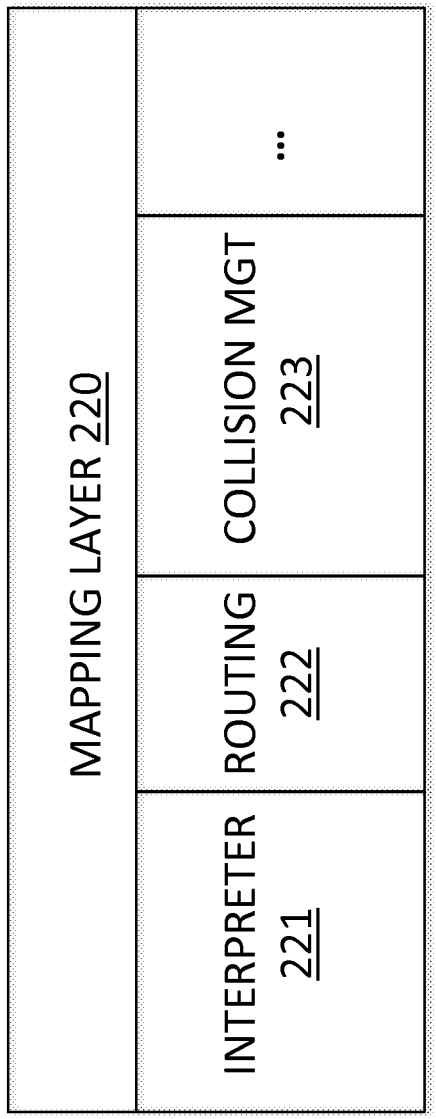

RESOLVING COMMUNICATION COLLISIONS IN A HETEROGENEOUS NETWORK

TECHNICAL FIELD

This application is directed to the field of control systems, and more particularly to the field of control systems used to manage multiple devices.

BACKGROUND OF THE INVENTION

The number of mobile computing devices is becoming bigger than the population of the earth. The annual sales of laptops, tablet, and smartphones, etc. is approaching more than two billion devices. People generally accept carrying and using mobile computing devices and being always reachable. Moreover, the cost for a chipset to communicate locally is below one dollar and the cost for mobile communication and data services has decreased dramatically in the last few years. Current technology provides LTE mobile broadband speeds of up to 300 Mbs.

Because of the ease and potential benefits of connecting devices, more devices are being connected. There are some estimates that, in the near future, as many as fifty billion devices will become connected via some network, such as the Internet. However, the ability to connect devices relatively easily does not directly address the issue of how to efficiently link different types of data such as mobile computing, social behavior, Internet business, mobile networks, etc. In the case of the manufacturing industry, groups like Industry 4.0 in Germany and the Smart Manufacturing Leadership Coalition in the U.S. have been established to address device connectivity issues in connection with manufacturing. These groups provide specifications for controlling industrial processes including, in some cases, the ability to connect infinite machines and devices. The specifications may also provide for intelligent process and service management, information transparency between users and across automation and production processes, Bring Your Own Device (BYOD) and Choose Your Own Device (CYOD) management of computing devices in line with company policies and legal frameworks, security and control of data in terms of access rights and service distribution, information relating to sharing and storing data hosted in private and/or public clouds, and scalable and affordable services for SME and branches of big companies.

The increased functionality that is provided in connection with industry specifications and requirements has placed substantial demand to the device providers who provide components used in industrial settings (and possibly home settings) for controlling and monitoring equipment. These components include PCs, routers, mobile computing devices, firewalls, servers, capillary devices having sensors and actuators, etc. The demand placed on the providers in connection with these components include linking and managing mobile computing devices (including BYOD/CYOD equipment), routing Wi-Fi data while providing optimized quality of service (QoS), integrating and managing capillary networks while providing optimized QoS, integrating LTE with 3GPP to provide communication, ensuring security, integrity and data protection for any data protocols that are used, facilitating the creation and integration of applications, allowing software and hardware integration for third parties, and generally providing business solutions for customers within a reasonable cost.

In some cases, optimized QoS may refer to the maximum achievable QoS (e.g., maximum data throughput and minimum message delay for the critical communication channels, etc.). In other cases, optimized QoS may refer to satisfactory QoS in consideration of additional boundary conditions and requirements (e.g., acceptable throughput and delay below the maximum achievable values for the critical communication channels in favor of more robust overall channel configurations that are less likely to suffer from transient disturbances, etc.).

In some instances, device providers design and fabricate substantially complete systems that include all the hardware and software needed for basic operations as well as hardware and software needed to provide features and capabilities desired by a device/machine manufacturer or by a particular end-user. However, a complete system from a single provider does not necessarily provide desired flexibility to address the issues mentioned above. In addition, a complete system from a single provider may not be able to quickly adapt to rapid changes in market demands or satisfy diverse requirements of multiple customers and users.

Accordingly, it is desirable to provide a system that allows for sufficient flexibility in connection with controlling and monitoring equipment.

SUMMARY OF THE INVENTION

According to the system described herein, a system that accesses managed devices in a heterogeneous network includes a controller, coupled to the managed devices, having processor hardware, an operating system running on the processor hardware, an application framework layer that provides low level communication and resource management to the operating system, and a mapping layer that that provides data routing for the system and includes a plurality of user equipment devices, coupled to the controller, that communicate with the managed devices through the controller, where the controller and the user equipment devices provide messages for the managed devices in a first format and where at least some of the managed devices receive messages in a plurality of different formats and wherein the mapping layer converts messages in the first format to at least one of the different formats prior to providing the messages to the managed devices. The first format may be a CoAP/LWM2M format. The different formats may include ZigBee, Z-Wave, EnOcean, and KNX. The processor hardware may include the Intel® Atom™ processor. The operating system may be the Android™ operating system. At least some of the user equipment devices may be Android™ platform devices. The controller may include a user interface and at least one antenna. The controller may communicate with a private cloud and/or a public cloud. The user equipment devices may communicate with the public cloud. The user equipment devices may communicate with the controller using Wi-Fi and/or a cellular communication network.

According further to the system described herein, accessing managed devices in a heterogeneous network includes communicating with the managed devices through a controller coupled to the managed devices and having processor hardware, an operating system running on the processor hardware, an application framework layer that provides low level communication and resource management to the operating system, and a mapping layer that that provides data routing for the system and includes creating messages for the managed devices using a first format and the controller converting at least some of the messages from the first format to at least one different format prior to providing the messages to the managed devices. The first format may be a CoAP/LWM2M format. The different formats may include ZigBee, Z-Wave, EnOcean, and KNX. The processor hardware may include the Intel® Atom™ processor. The operating system may be the Android™ operating system. At least some of the user equipment devices may be Android™ platform devices. The controller may include a user interface and at least one antenna. The controller may communicate with a private cloud and/or a public cloud. The user equipment devices may communicate with the public cloud. The user equipment devices may communicate with the controller using Wi-Fi and/or a cellular communication network.

According further to the system described herein, resolving heterogeneous communication collisions in a system includes measuring a quality-of service value for at least one communication connection, determining if a communication collision is reducing the quality-of-service value to below a pre-determined threshold, and, if a communication collision is reducing the quality-of-service value to below a pre-determined threshold, iteratively modifying the at least one communication connection until either a maximum number of iterations has been exceeded or the quality of service value exceeds the pre-determined threshold, where modifying the at least one communication connection includes changing technology used by at least one interface corresponding to the communication connection, changing a frequency band used by at least one interface corresponding to the communication connection, changing transmission parameters used by at least one interface corresponding to the communication connection, using transmission gaps to transmit data, rescheduling transmission of data, and/or rerouting a communication path and modifying at least one of the interfaces corresponding to the at least one communication connection and where the system includes electronic devices that communicate using different protocols and/or different communication technologies. The technology used by at least one interface may include Wi-Fi, LTE, HSPA (3G), and GSM (2G). The technology used by at least one interface may include Wi-Fi, ZigBee, Z-Wave, KNX-RF, 6LoWPAN and EnOcean. Changing transmission parameters may include reducing transmission rates, switching from multicarrier transmission to single carrier transmission, and/or creating guard-bands within given frequency bands to allow coexistence of different technologies in one frequency band. Using transmission gaps may include having a device report transmission gaps prior to using the transmission gaps. Rerouting the communication path may include switching to a different type of interface. The different types of interface may include a LAN Ethernet, a LAN Wi-Fi, a WAN LTE, a WAN HSPA, and a WAN GSM. The at least one communication connection may use redundancy technologies and/or error correction techniques. The at least one communication connection may be a connection to a mobile device. The mobile device may provides control operations for the system. The at least one communication connection may be connected to a private cloud and/or a public cloud. The at least one communication connection may be connected to an external radio device that is external to the system.

According further to the system described herein, a non-transitory computer-readable medium contains software that resolves heterogeneous communication collisions in a system that includes electronic devices that communicate using different protocols and/or different communication technologies. The software includes executable code that measures a quality-of service value for at least one communication connection, executable code that determines if a communication collision is reducing the quality-of-service value to below a pre-determined threshold, and executable code that iteratively modifies the at least one communication connection until either a maximum number of iterations has been exceeded or the quality of service value exceeds the pre-determined threshold if a communication collision is reducing the quality-of-service value to below a pre-determined threshold, where modifying the at least one communication connection includes changing technology used by at least one interface corresponding to the communication connection, changing a frequency band used by at least one interface corresponding to the communication connection, changing transmission parameters used by at least one interface corresponding to the communication connection, using transmission gaps to transmit data, rescheduling transmission of data, and/or rerouting a communication path and modifying at least one of the interfaces corresponding to the at least one communication connection. The technology used by at least one interface may include Wi-Fi, LTE, HSPA (3G), and GSM (2G). The technology used by at least one interface may include Wi-Fi, ZigBee, Z-Wave, KNX-RF, 6LoWPAN and EnOcean. Changing transmission parameters may include reducing transmission rates, switching from multicarrier transmission to single carrier transmission, and/or creating guard-bands within given frequency bands to allow coexistence of different technologies in one frequency band. Using transmission gaps may include having a device report transmission gaps prior to using the transmission gaps. Rerouting the communication path may include switching to a different type of interface. The different types of interface may include a LAN Ethernet, a LAN Wi-Fi, a WAN LTE, a WAN HSPA, and a WAN GSM. The at least one communication connection may use redundancy technologies and/or error correction techniques. The at least one communication connection may be a connection to a mobile device. The mobile device may provides control operations for the system. The at least one communication connection may be connected to a private cloud and/or a public cloud. The at least one communication connection may be connected to an external radio device that is external to the system.

The system described herein provides a control system for managing home and industrial devices/machines over heterogeneous capillary networks via wired, mobile and wireless telecommunication systems. The system provides a consistent environment to permit users to execute standardized enterprise system applications in a secure trustworthy and flexible manner, without it being necessary to redesign the system for each enterprise-type, enterprise-devices/machines, enterprises-back end systems and enterprise-corporate users. The system defines a common OSI layout both for the controller and for user equipment devices to be used for accessing, managing, controlling and operating the system.

The system provides a mechanism to link multiple mobile user equipment (UE) devices to a controller to control different devices that are heterogeneous and exhibit mixed criticality syncing conflicts. The system provides a mechanism to migrate UE devices and other devices that operate according to different industrial standards to avoid collisions. The system supports Bring Your Own Device (BYOD) functionality and Choose Your Own Device (CYOD) functionality and the ability to configure and to reconfigure the controller for reconfiguration maintenance using the UE devices. Devices that do not possess rooted trust mechanisms may be made secure. The system manages the prospective collisions of linked devices and UE devices. The system has a structured mapping layer on top of the framework of the UE devices and the controller to present the same architecture structure for both, to allow the same software modules to be used in both. The system provides message and data routing functionality.

The controller has a mobile chipset assembly and uses software service components having a plurality of functional software units, a hardware component having a plurality of hardware units associated with and controlled by the plurality of functional software units, and an interface component having at least one interface for providing access to the controller. The controller also includes application software loaded and executed on the controller via at least one interface. The software may be loaded using any appropriate mechanism, including directly from media, via remote update of the software (in part or in entirety) on the controller, and/or on the UEs over the air.

BRIEF DESCRIPTION OF THE DRAWINGS

Embodiments of the system described herein will now be explained in more detail in accordance with the figures of the drawings, which are briefly described as follows.

FIG. 8 is a schematic illustration of a mapping layer and subcomponents thereof according to embodiments of the system described herein.

DETAILED DESCRIPTION OF VARIOUS EMBODIMENTS

Figure 1:
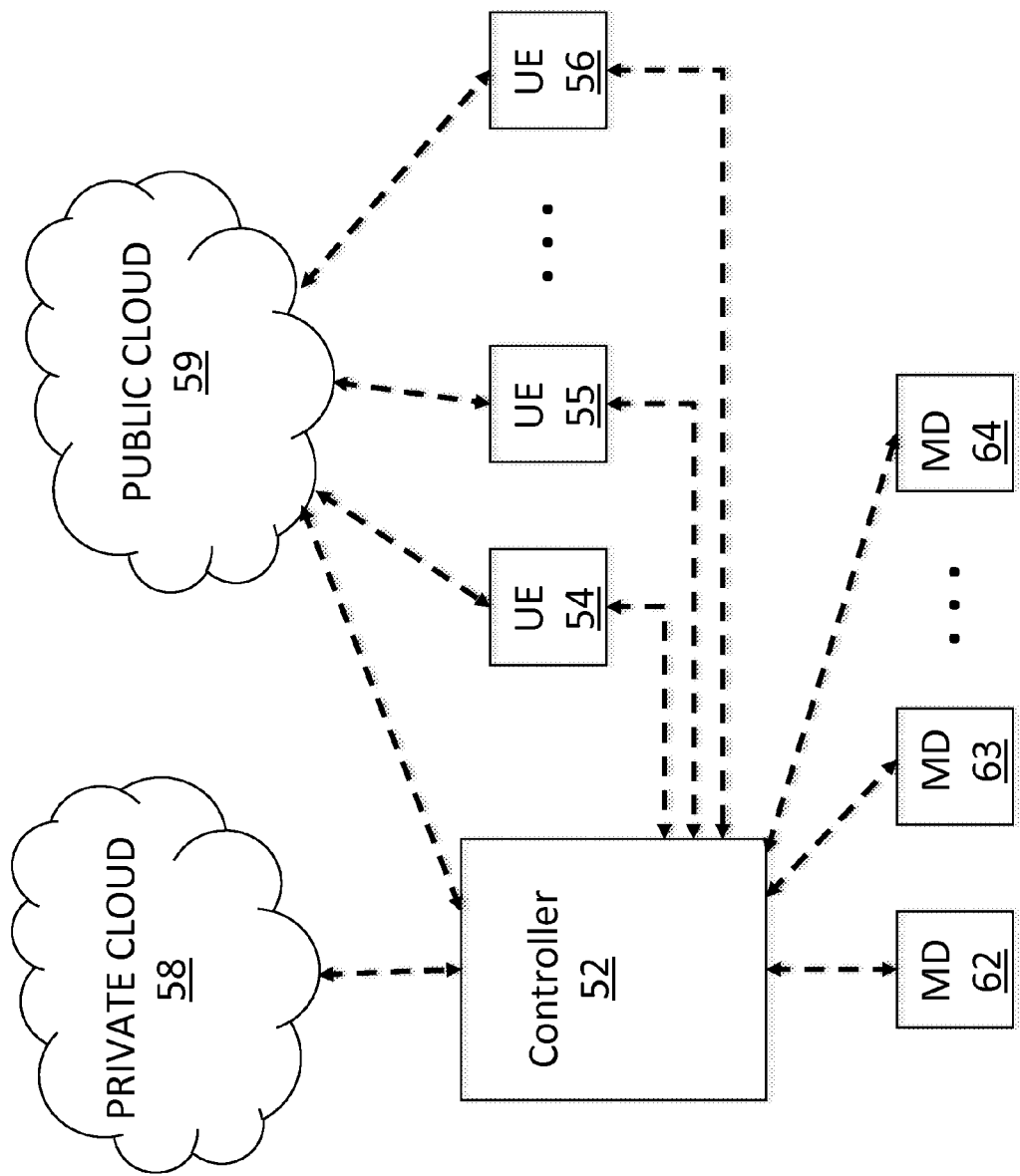
FIG. 1 is a schematic illustration of a control system according to embodiments of the system described herein.

Referring to FIG. 1, a control and monitoring system 50 includes a controller 52 and a plurality of user equipment (UE) devices 54-56 coupled thereto. The controller 52 may be implemented using conventional computing hardware capable of providing the functionality described herein. For example, the controller 52 may be implemented using the Intel® Atom™ Processor development board provided by the Intel Corporation, which may be augmented with additional components, as described herein. The controller 52 may use the Android™ operating system.

The UE devices 54-56 may be provided by Android™ platform devices, such as cell phone devices and/or tablets, or other types of devices, such as iOS devices or Windows® operating system devices. The UE devices 54-56 may be off-the-shelf devices programmed to provide the functionality described herein. The UE devices 54-56 may all be the same type of device, may all be different types of devices, or some combination thereof. There may be any number of the UE devices 54-56. The UE devices may be owned and fully controlled by the user (BYOD—bring your own device), or owned by the user and subject to certain usage and configuration restrictions imposed by a third party or company (CYOD—chose your own device). The BYOD functionality explicitly also supports UE devices that are issued by a third party or company but made available to the user for business and personal use (COPE—company issued, personally-enabled), as well as UE devices that are corporate-owned and for business-use only (COBO—corporate owned, business-only). The UE devices 54-56 communicate with the controller 52 using any appropriate mechanism/protocol, such as Wi-Fi and/or cellular communication via a cellular network, such as the T-Mobile cellular network.

The system 50 may also include a private cloud 58 in communication with the controller 52 and may include a public cloud 59 that is in communication with the controller 52 and the UE devices 54-56. The private cloud 58 may be implemented using a private cloud service hosted by a private entity using the controller 52 while the public cloud 59 may be implemented using a public cloud service, such as the Amazon S3 service or a public cloud service provided by a cellular network carrier, such as T-Mobile. The controller 52 may communicate with the private cloud 58 using Wi-Fi and/or a wired connection (e.g., an Ethernet connection) and/or any other appropriate communication mechanism. The controller 52 and the UE devices 54-56 may communicate with the public cloud 59 using Wi-Fi and/or cellular communication and/or any other appropriate communication mechanism. The clouds 58, 59 may be used to store data and/or software for the system 50.

The system 50 also includes a plurality of managed devices 62-64, which are devices that accept commands and provide information through the controller 52. The managed devices 62-64 may be heterogeneous in that the managed devices 62-64 may all be different and may be provided by different vendors and coupled to the controller 52 using different types of protocols. The managed devices 62-64 may be industrial machines, actuators (e.g., light switches, power switches, etc.), sensors (e.g., accelerometers, humidity and temperature sensors, etc.), or any device that may be externally controlled and/or may provide data that may be stored and/or viewed by a user. Each of the managed devices 62-64 may be connected to the controller 52 using a capillary network having an appropriate protocol, such as the ZigBee protocol, the Z-Wave protocol, the EnOcean protocol, the KNX protocol, etc.

Users of the system 50 operate one or more of the UE devices 54-56 to control one or more of the managed devices 62-64 and/or to receive data from one or more of the managed devices 62-64. Applications are provided on the UE devices 54-56 and on the controller 52 to provide the functionality described herein.

Figure 2:
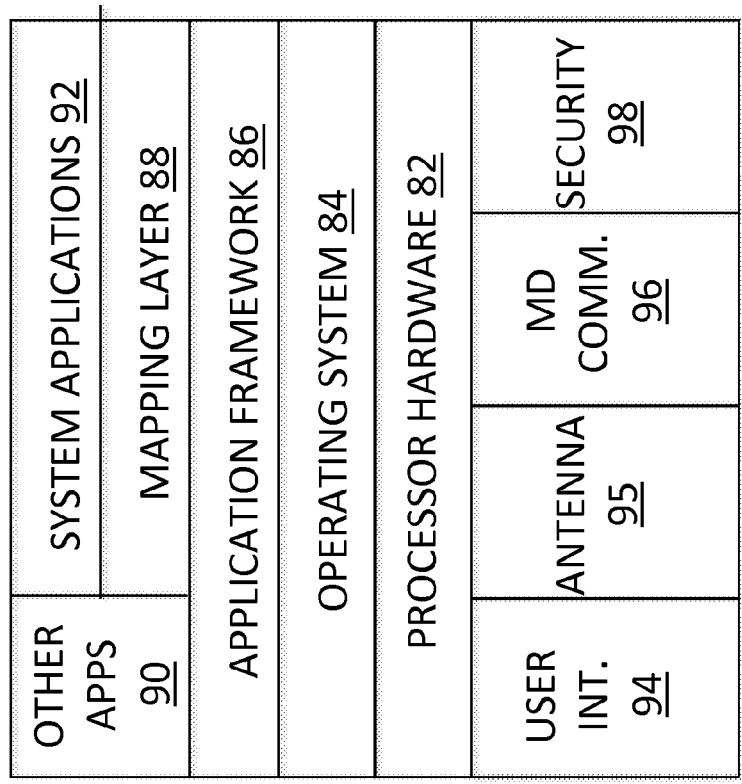
FIG. 2 is a schematic illustration of a controller for a control system according to embodiments of the system described herein.

Referring to FIG. 2, the controller 52 is illustrated schematically as including processor hardware 82, an operating system 84, an application framework 86, a mapping layer 88, and a plurality of system applications 92 and other applications 90. The processor hardware 82 includes conventional components such as a processor, volatile memory, non-volatile memory, etc. As discussed elsewhere herein, the processor hardware 82 may be implemented using the Intel® Atom™ Processor and Printed Circuit boards. The operating system 84 may include a native library service. In an embodiment herein, the operating system 84 may be the Android™ operating system, although other operating systems, such as the Windows® operating system or Apple iOS may be used.

The application framework 86 and the mapping layer 88 work together to provide a generic interface for the system applications 92. The application framework 86, which may be provided by the Android™ application framework, is a low level communication and resource management layer that communicates with the operating system 84. The mapping layer 88 may be a multi-protocol/multi-standard communication layer that provides data interpretation, data routing and collision management, which is described in more detail elsewhere herein.

The mapping layer 88 establishes connections and routes data between system components and manages collisions when multiple components attempt to use the same or nearly the same communication channel (e.g., Wi-Fi frequency band) at around the same time. The application framework may include abstractions and low-level interfaces for: hardware (e.g., physical extension cards and secure elements, etc.); communication interfaces (e.g., Wi-Fi, LTE, etc.); operating system managed resources (e.g., file storage, video camera, microphone, etc.); and kernel service accelerators (e.g., interfaces to prioritized mapping layer or communication services implemented in kernel mode, etc.). Data interpretation and routing is discussed in more detail elsewhere herein.

Collision management may be executed on the controller 52 and on the connected UE devices 54-56. Collision management on the controller 52 may also include coordination and reconfiguration of the UE devices 54-56 or of other external entities to which the controller 52 is connected by wired or wireless connectivity. Collision management is discussed in more detail elsewhere herein. The mapping layer 88 also handles and translates communication between devices using different protocols. The mapping layer 88 also handles communication security aspects related to message interpretation and routing.

The application framework 86 and the mapping layer 88 allow system applications 92 to be written without the need to address specific details of the underlying hardware and operating system software. Note also that the system applications 92 may be relatively stable (i.e., may not need to change or may change relatively little) with respect to changes in the underlying hardware and/or operating system software. For example, a particular one of the system applications 92 provided to control a particular one of the managed devices 62-64 may be provided without having specific knowledge of the interface between the particular one of the managed devices 62-64 and the controller 52 (e.g., ZigBee, Z-Wave, etc.) and without having specific knowledge of the hardware and operating system software used to implement the controller 52. The system applications 92 may be generic to different systems having different hardware, different layouts, and different operating systems. Thus, an entity may provide a generic application for controlling a specific type of device without needing to consider details relating to connections between the specific type of device and the controller 52 or the presence or absence of other devices in the system or specific hardware and low level software (e.g., operating system) used to implement the controller 52, etc. The other applications 90 represent user applications that do not interact with the system described herein.

The controller 52 also includes additional hardware components such as user interface (USER INT) components 94, antennas 95, a plurality of managed device communication (MD COMM) modules 96, and security components 98. In an embodiment herein, the user interface components 94 include an HDMI or any other external audio and/or video interface that allows connection of external screen or loudspeaker to provide status information on the controller 52, or touch screen (not shown) to interact with the controller 52, and possible USB and SD Card interfaces to facilitate physical data transfer to and from the controller 52. In general, the audio and/or video interface may be a Display Port, a VGA port, etc. with appropriate capabilities in combination with USB/SD-Card interfaces. There may even be situations where an audio interface is provided, for example, to give audible alarms in case of detected security violations (e.g., non-conformant UEs, UEs with corrupted applications, UEs that are flagged as potentially malicious due to earlier incidents, etc.). The antennas 95 may provide wireless communication for the controller 52, including Wi-Fi and cellular network connectivity.

The managed device communication modules 96 provide data connections to the heterogeneous managed devices 62-64 coupled to the controller 52 using different protocols, etc., described herein. The managed device communication modules 96 may be connected to the processor hardware 82 using any appropriate mechanism, including plug-in cards, USB connections, etc. In an embodiment herein, each of the managed device communication modules 96 provides a different type of communication so that, for example, one of the managed device communication modules 96 provides ZigBee communication, another provides Z-Wave communication, another provides EnOcean communication and another provides KNX communication. Of course, other types of wireless and wired communication may also be provided by the managed device communication modules 96.

In other embodiments herein, some managed device communication modules 96 may provide complementary or redundant types of communication. For instance, it is possible to have two additional Wi-Fi extension cards, to use for dedicated communication with capillary network devices (the managed devices 62-64), or to use as redundant interfaces operating in different Wi-Fi channels and frequencies (for efficient parallel transmission, channel sensing, collision resolution, etc.).

The security components 98 provide security functionality for the system. In an embodiment herein, the security components 98 may include a secure element (not shown), which is a connected device that is used for holding sensitive data keys and small applications that provide security algorithms (Applets). The system described herein may be security hardened to meet common criteria (CC) levels up to level six, which is tamper resistant to security threats and attacks. The security components 98 may include a CPU, Crypto coprocessors and accelerators, and secure non-volatile storage and may use the Java Operating System with applets. The secure element may be integrated through SPI, I$^2$C, or ISO 7816 based interfaces. In some embodiments, it is possible to provide security using a conventional SIM card/chip that is separate from any SIM card/chip used with any cellular network devices herein.

In other embodiments, it is possible that the controller 52 includes RF-interfaces and supports RF security protocols. The RF interfaces may support Near Field Communication (NFC) and ISO/IEC 18000 type air interfaces (e.g., ISO/IEC 18000-63 UHF RFID with security and file management, etc.). The RF security protocols may include crypto suite standards of the ISO/IEC 29167 family of standards (e.g., ISO/IEC 29167-10 AES-128, ISO/IEC 29167-10 ECC-DH, etc.). The secure element may be used to securely bootstrap, configure, reconfigure, reset and pair the UE with the controller via RF signals. The secure element may be also be used to securely retrieve identification, status and error information from the UE and the controller.

Figure 3:
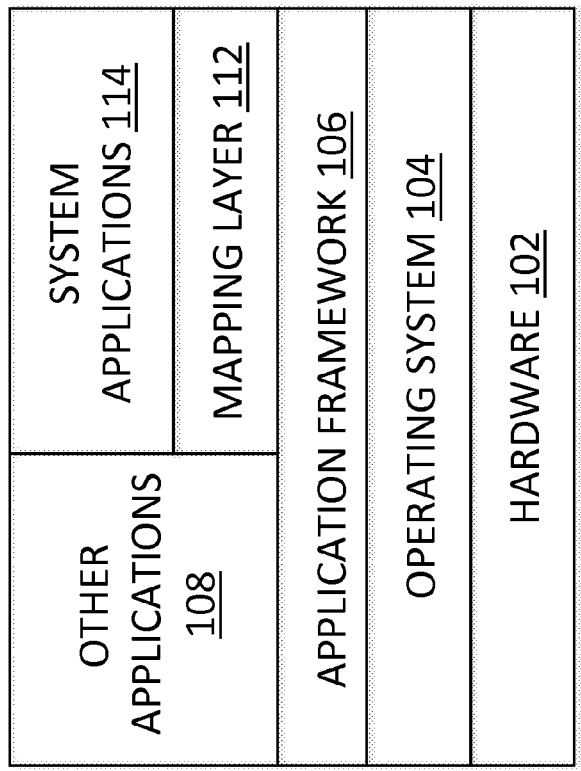
FIG. 3 is a schematic illustration of a user equipment (UE) device according to embodiments of the system described herein.

Referring to FIG. 3, the UE device 54 is shown in more detail as including hardware 102, an operating system 104, an application framework 106, other applications 108, a mapping layer 112, and system applications 114. The hardware 102 corresponds to the physical hardware for the UE device 54. In an embodiment herein, the hardware 102 is provided by an off-the-shelf cellular telephone or tablet device. The operating system may be the Android™ operating system and the application framework 106 may be the Android™ application framework. The other applications 108 represent user applications that do not interact with the system described herein that a user may run when the device 54 is not being used with the controller 52.

The mapping layer 112 is similar to the mapping layer 88 used for the controller, except that the mapping layer 112 may not perform routing and collision management for capillary networks used to connect with the managed devices 62-64. The system applications 114 are provided with an interface that remains stable even if the underlying hardware 102 and low level software 104, 106 changes. In an embodiment herein, the system applications 114 may be the same as or similar to the system applications 92 provided for the controller 52. Thus, the system applications 114 may be generic to different systems having different hardware and different layouts and may be generic to different UE devices possibly implemented using different hardware and/or different operating systems.

The system applications 92 for the controller 52 and the system applications 114 for the UE device 54 may be provided through an application repository, such as the Google Play™ store. Some of the applications 92, 114 may provide system administrator functionality, allowing an administrator to reconfigure the system, including changing the managed devices 62-64, changing the UE devices 54-56, etc. Other ones of the applications 92, 114 may be user applications that allow a user to control and/or monitor one or more of the managed devices 62-64. Some of the applications 92, 114 may provide for transferring data to and from the clouds 58, 59 and the controller 52 and the UE devices 54-56. Note also that some of the applications 92, 114 may provide advanced data filtering, aggregation, monitoring, firewalling and/or other security and intermediate processing services related to the transferring of data to and from the clouds 58, 59 and the controller 52 and the UE devices 54-56.

In some embodiments, the managed devices 62-64 may have different classes of capabilities, including different communication capabilities, different security capabilities, different processing capabilities, different data storage and buffering capabilities, different communication and security protocol capabilities, different control capabilities, etc. Some of the managed devices may only be sensors that provide data to the controller 52. Other ones of the managed devices 62-64 may be controllable machines, such as an industrial controller with an M2M card.

In an embodiment herein, each of the managed devices 62-64 may address each of the applications 92, 114 using an IP address. The mapping layer 88 handles mapping of the IP addresses used by the applications 92, 114 to route messages and data via the capillary networks to the managed devices 62-64. Note that some of the protocols used by the capillary networks may not employ IP addresses at all but, instead, may use other mechanisms to address particular ones of the managed devices 62-64. Nevertheless, the mapping layer 88 allows all of the managed devices 62-64 to be addressed using IP addresses from outside of the system. The applications 92, 114 may provide communication in the well-known LWM2M (lightweight M2M) format, even though some of the managed devices 62-64 and capillary networks may not support LWM2M. The mapping layer 88 handles conversion of the LWM2M commands and other data into a format used by a target one of the managed devices 62-64. In some embodiments, the conversion of the LWM2M commands and other data into a format used by a target one of the managed devices 62-64 is handled by the application framework 106 (e.g., device drivers), in the managed device communication modules 96 (e.g., embedded software in the respective physical extension cards), or handled in a coordinated fashion by components distributed over the mapping layer 88, the application framework 106, and the managed device communication modules 96. In some cases, the capillary networks support IEEE 802.15.4 data link and physical layers.

Figure 4:
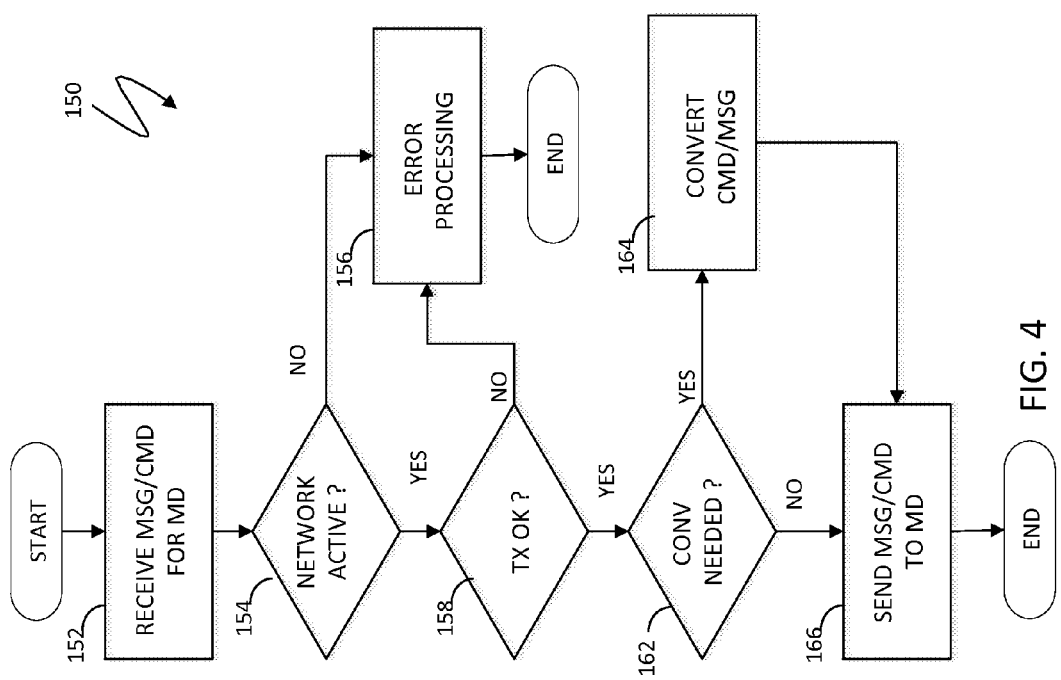
FIG. 4 is a flow diagram illustrating processing performed by a mapping layer in connection with communicating with a managed device, according to embodiments of the system described herein.

Referring to FIG. 4, a flow diagram 150 illustrates processing performed by the mapping layer 88 in connection with providing a message to each of the managed devices 62-64. Processing begins at a first step 152 where the mapping layer receives a message for the destination one of the managed devices 62-64. The message may be sent directly by the controller 52 or by one of the UE devices 54-56 through the controller 52. Following the step 152 is a test step 154 where it is determined if the destination capillary network is active. In an embodiment herein, during initialization, each capillary network registers with the controller 52 to be made active. If it is determined at the test step 154 that the destination network is not active, then control transfers from the test step 154 to a step 156 where error processing is performed. The error processing performed at the step 156 can include any appropriate error handling mechanism, including providing a message to the sending device indicating the error. Following the step 156, processing is complete.

If it is determined at the test step 154 that the destination network is active, then control transfers from the step 154 to a step 158 where it is determined if the transmission is allowed. In some embodiments, there may be restrictions for messages, including security restrictions based on the source and destination of the messages (e.g., UE device X is not allowed to send a message of type Y to managed device Z). If it is determined at the test step 158 that the transmission is not allowed, then control transfers from the step 158 to the step 156, discussed above, where error processing is performed. In some embodiments, the specific error processing performed at the step 156 may depend upon the type of error so that, for example, the processing performed at the step 156 when a capillary network is not registered is different than the processing performed at the step 156 when transmission is not allowed. Following the step 156, processing is complete.

If it is determined at the step 158 that transmission is allowed, then control transfers from the step 158 to a step 162 where it is determined if conversion is needed. In some cases, the native format of a message/command from the controller 52 or from one of the UE devices 54-56 (and through the controller 52) is the same format used by the destination one of the managed devices 62-64. For example, the sender may use the LWM2M format and the destination may also use the LWM2M format, in which case conversion may not be necessary. On the other hand, if, for example, the sender is using a particular format such as LWM2M and the receiving managed device is using, for example, the ZigBee network protocol, then conversion may be necessary.

If it is determined at the step 162 that conversion is needed, then control transfers from the test step 162 to a step 164 where the conversion is performed. Following the step 164, or following the step 162 if conversion is not needed, is a step 166 where the message is sent to the receiving managed device via the capillary network that includes the managed device. Following the step 166, processing is complete.

Figure 5:
FIG. 5 is a schematic illustration of a CoAP/LWM2M message format according to embodiments of the system described herein.

Referring to FIG. 5, a schematic diagram 180 illustrates a message format used by the controller 52 and/or the UE devices 54-56 to provide data/commands to the managed devices 62-64. In an embodiment herein, messages provide an LWM2M message format on top of a CoAP (Constrained Application Protocol) message format. Of course, any appropriate message format may be used, provided it is consistent with the functionality described herein.

In another embodiment herein, messages may contain an additional custom header and/or footer, which may include complementary address, status, error and processing information (e.g., internal source and/or destination reference addresses, message prioritization flags, content descriptors, internal processing directives, etc.). Such additional information may be used in the mapping layer 88, the application framework 86, the managed device communication modules 96, and in embedded software running in dedicated hardware components for managed device communication modules, as well as in other components and layers where the processing of the messages with the custom header and/or footer may be of interest.

The CoAP/LWM2M message format includes a version field, indicating the version of the format used in the message. A receiving device may need to know the format version of a received message in order to be able to properly parse the message. The CoAP/LWM2M message format may also include a type field, indicating to the receiver the type of data being sent (e.g., command, inquiry, acknowledgement, etc.), and may include a token length field indicating the length of an optional token. In some cases, it may be advantageous to include tokens with messages as additional markers. For example, in a request/response sequence, the requesting device may include a specific token with the request and the responding device may provide the same token in the response to ensure greater integrity. In instances where a token is not used, the token length (TKL) may be set to zero.

The CoAP/LWM2M message field may also include a code field indicating a particular method to be used by a receiver and a message ID field. A token may also be provided, if the token length field (TKL) is not zero. There may also be a field for any LWM2M options that are being provided, a field for the LWM2M message. As discussed elsewhere herein, the mapping layer 88 may receive the CoAP/LWM2M format message and convert the message to a format understood by the one of the managed devices 62-64 receiving the message. In other cases, the mapping layer 88 may trigger the message conversion to be performed in the managed device communication modules 96.

The CoAP/LWM2M message may be cryptographically protected for security reasons (e.g., for confidentiality, integrity, and authenticity protection, etc.). For that, the CoAP/LWM2M message may be encrypted in parts or may be entirely encrypted (e.g., by encrypting the complete message using a symmetric block cipher such as the Advanced Encryption Standard (AES), etc.). Apart from the encryption, optional descriptive security headers and footer may be added to the encrypted message. In an embodiment herein, datagram transport layer security (DTLS) may be used for cryptographic protection of the CoAP/LWM2M message. Of course, other types of datagram-oriented transport layer security mechanism also may be used.

Referring back to FIG. 1, the plurality of managed device communication modules 62-64 may contain fixed or removable hardware extensions. Individual hardware extensions of one module may also be used by one or more other device communication modules if there is compatibility on the hardware, protocol and/or software level. In an embodiment herein, the hardware extensions may be operated through software in the controller 52. In another embodiment, some or all of the hardware extensions of the managed device communication modules 62-64 may be operated by embedded software running on the respective hardware extensions themselves.

In order to be able to resolve collisions, the controller 52 may be configured to detect collisions (interferences). Collision detection may include a measurement of the quality of transmission between the controller 52 and devices in communication with the controller 52. In particular, the controller 52 may measure a signal quality of signals received by the controller 52. For example, a collision may be detected when the signal quality is below a predefined threshold (which may equivalent to a bit error rate being above a predefined threshold). According to one embodiment, collision detection, like the resolution of collisions, may be performed by the mapping layer 88. In some instances, retransmissions of an acknowledgement from the managed devices 62-64 in communication with the controller 52 are statistically evaluated, in which case, a collision may be detected when an average number of retransmissions reaches (or is above) a predefined threshold.

Collision detection may also involve analysis at one or more of the UE devices 54-56. In this embodiment, the controller 52 may trigger a particular one of the UE devices 54-56 to analyze the most recent communication transfers by the particular one of the UE devices 54-56. The most recent communication transfers may include communication transfers within several seconds up to several minutes before the particular one of the UE devices 54-56 was triggered by the controller 52 to analyze communication transfers. Analysis of communication transfers may include analyzing bit error rates and/or quality levels of the communication transfers. The particular one of the UE devices 54-56 may then return a result of the analysis to the controller 52. In addition to information on the quality of the most recent communication transfers, the result of the analysis may include information on communication protocols used in connection with the most recent communication transfers, such as Wi-Fi, LTE, 3G, 2G, Bluetooth, and/or similar.

In some cases, before the controller 52 triggers the particular one of the UE devices 54-56 to perform the analysis explained above, the controller 52 may be configured to suspend communication with the managed devices 62-64 and other ones of the UE devices 54-56 that use communication channels (communication protocols) that may interfere with communication between the controller 52 and the particular one of the UE devices 54-56. For example, when an interface uses a Wi-Fi protocol for communication with the particular one of the UE devices 54-56, all wireless communication between the controller 52 and the managed devices 62-64 and other ones of the UE devices 54-56 that use the same Wi-Fi band are suspended to reduce interference with communication between the controller 52 and the particular one of the UE devices 54-56. This facilitates the particular one of the UE devices 54-56 safely receiving a command that triggers the particular one of the UE devices 54-56 to perform the analysis.

Based on collision detection performed by the controller 52, and optionally also based on analysis performed by one or more of the UE devices 54-56, the controller 52 may resolve possible collisions. According to one embodiment, the controller 52 may be configured to re-route message to a particular one of the managed devices 62-64 after a collision has been detected. Re-routing messages may include transmitting messages to a first one of the managed devices 62-64 via a second one of the managed devices 62-64. The controller 52 may include a configuration library having information on how communication and the managed devices 62-64 and the UE devices 54-56 are configured. In particular, the configuration library may include information on how the individual ones of the managed devices 62-64 and the UE devices 54-56 are spatially and logically arranged in the system. Additionally, the controller 52 may include a device library having specific information on individual ones of the managed devices 62-64 used in the system. For example, the device library may include information on whether a specific one of the managed devices 62-64 has a functionality to act as a relay that can receive messages from the controller 52 and forward the messages to another one of the managed devices 62-64. According to one embodiment, the configuration library and the device library are integrated in the controller 52. Alternatively, the configuration library and the device library may be located in external storage, such as in one of the clouds 58, 59, to which the controller 52 has access.

In collision resolution explained herein, the controller 52 may maintain the same radio technology to communicate with the managed devices 62-64 and the UE devices 54-56 and may try to avoid/resolve collisions by suitably scheduling communication, re-transmitting messages, rerouting messages, etc. This type of collision resolution corresponds to homogeneous collision management (homogeneous collision resolution). The controller 52 may not only be configured to manage (detect and resolve) collisions by taking actions within the same radio technology, but may also be configured to manage (detect and resolve) collisions occurring in connection with communication with one of the managed devices 62-64 that communicates with the controller 52 in one type of radio technology by taking actions in connection with communication with another one of the managed devices 62-64 that communicates with the controller 52 using a different radio technology or through another interface (of the same or different radio technology).

Figure 6:
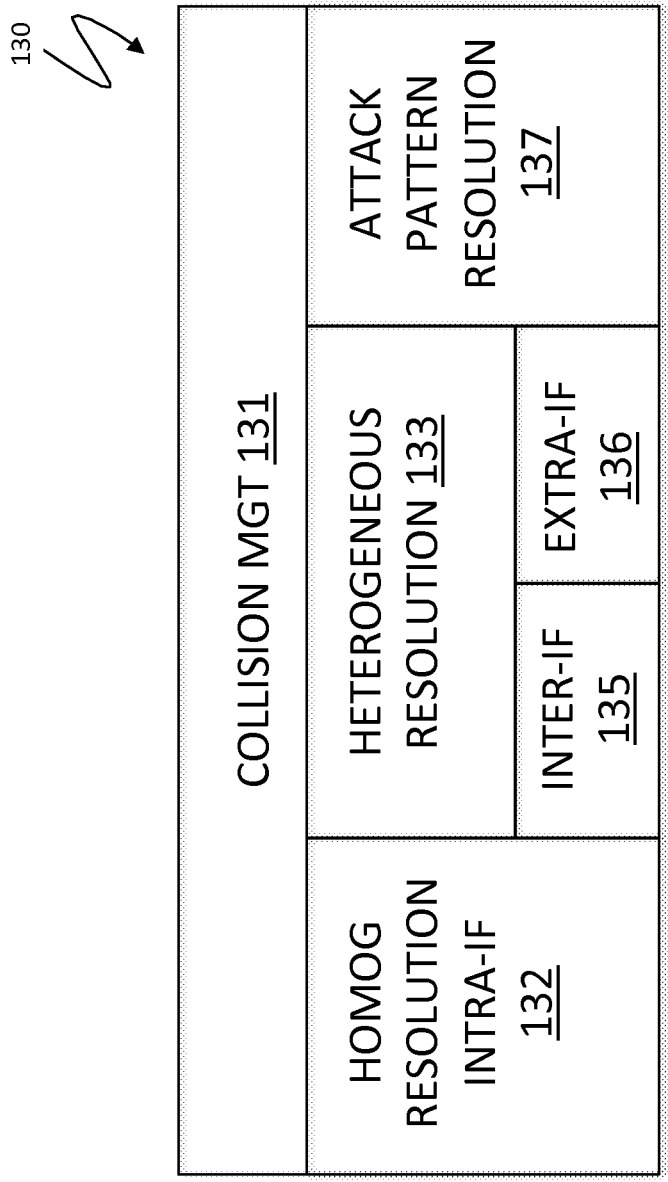
FIG. 6 is a schematic illustration of collision management mechanisms according to embodiments of the system described herein.

Referring to FIG. 6, a schematic diagram 130 illustrates functionalities of a collision management (COLLISION MGT) module 131 that may be provided in the mapping layer 88. Collision management deals with both incidentally occurring and arbitrarily caused collisions.

For incidental collisions, collision management performs homogeneous intra-interface (HOMOG RESOLUTION INTRA-IF) 132 and heterogeneous resolution (HETEROGENEOUS RESOLUTION) 133 of collisions. Homogeneous resolution of collisions is performed through analysis and reconfiguration restricted to the individual interface (INTRA-IF) on the controller 52 or the one of the UE devices 54-56 causing or affected by a collision. Heterogeneous resolution may either be performed by an INTER-IF module 135 involving two or more local interfaces on the same physical platform (e.g., on the controller 52 or on one of the UE devices 54-56), and/or by an EXTRA-IF module 136 involving the controller 52 coordinating at least one external interface. In an embodiment herein, the EXTRA-IF module 136 involves at least one interface on one of the UE devices 54-56 connected to the controller 52. In another embodiment herein, the EXTRA-IF module 136 involves at least one communication interface on an external networking device that is reachable and configurable by the controller 52, and that is different from the controller 52 and the UE devices 54-56.

The module HOMOG RESOLUTION INTRA-IF 132 may be implemented using conventional homogeneous collision resolution mechanisms known in the art. Accordingly, configuring a Wi-Fi access point on the controller by avoiding channels that are diagnosed as being occupied by other Wi-Fi access points and selection of an unoccupied channel in the context of the innovation described herein is considered an example of conventional intra-interface collision management.

The EXTRA-IF module 136 may be implemented on the controller 52 to change the mode of operation of communication interfaces on the UE devices 54-56 connected to the controller 52, even if some of the communication interfaces on the UE devices 54-56 are not used for communication with the controller 52 but, instead, are used with other network entities and thus may interfere in some way with the communication of the controller 52. For example, the EXTRA-IF module 136 may change configuration parameters of Wi-Fi and 3GPP interfaces on one or more of the UE device 54-56, or even temporarily turn-off some of the interfaces on the UE devices 54-56, in order to resolve collisions detected on the controller 52. Changing the mode of operation may include changing the Wi-Fi configuration of the UE when the controller 52 and the UE device(s) 54-56 use Wi-Fi to communicate, for example, with each other.

The EXTRA-IF module 136 may also be implemented on the controller 52 to change the mode of operation of other radio devices that are different from the UE devices 54-56, and which are connected to the controller 52. An example of such other radio devices includes a Wi-Fi access point that the controller 52 may use to access one of the clouds. Changing the mode of operation in this context may include configuring/selecting a different communication channel and/or communication band on the Wi-Fi access point, for example.

For the heterogeneous collision management and heterogeneous attack management, collision management is performed in a coordinated manner across borders and restrictions of individual communication interfaces and technologies. The heterogeneous collision management thus provides a new holistic approach to collision management in communication systems where the diversity of communication technologies and standards, as well as the density of the physical distribution of the communication entities, may vary significantly over time. In particular, the heterogeneous collision management concepts and mechanisms described herein may be suitable to maintain acceptable or even optimal communication performance in situations where an isolated optimization of individual communication interfaces and/or technologies as part of conventional collision management would invariably result either in a significantly degraded or even in an insufficient quality-of-service and performance of the communication between the entities of the system described herein, rendering a reliable operation technologically and/or ergonomically infeasible.

Collisions that are suspected to have been caused arbitrarily by an attacker are handled by an attack pattern resolution module (ATTACK PATTERN RESOLUTION)

137, which performs advanced heuristics for detection and resolution of attacks. The types of attacks that are treated are denial-of-service (DoS) attacks that aim at reducing the availability or quality-of-service of the control and monitoring system, and intrusion attacks that aim at illegitimately modifying and/or spying out information circulating or being stored in the control and monitoring system. Of course support for treating other types of attacks may also be added to the attack pattern resolution sub-module. The collision management module 131 and the corresponding sub-modules 132-137 may be extensible and may be updated offline or online during operation.

Implemented attack resolution mechanisms include but are not limited to: isolating either the source of the attacks by filtering in the respective communication interfaces where the collision are created or responsible messages are received; treating the messages involved in the collision in a specialized manner; and temporarily isolating the affected communication interfaces.

The homogeneous resolution 132 of collisions may be achieved by adjusting specific properties of a single affected communication interface. No other communication interfaces need to be modified in the process. In an embodiment herein, homogeneous resolution heuristics evaluate message sending (RX), receiving (TX), and retransmission (RTX) and other relevant status information of a specific interface, in order to derive potential reconfigurations for a corresponding interface, or in order to detect potential higher-level issues that are to be treated by the more powerful and complex heterogeneous resolution 133.

Heterogeneous resolution 133 of collisions aims to exploit network redundancy in order to bypass a communication interface that reports or exhibits a collision in order to resolve the collision by switching to an alternative communication interface that satisfies the communication QoS requirements, or by evaluating and reconfiguring two or more communication interfaces to resolve or mitigate the collision. The heterogeneous resolution 133 that is part of the collision management 131 on the controller explicitly extends to measuring and, if appropriate, modifying relevant properties on the UE devices 54-56 (e.g., measurement of communication configuration and QoS parameters; reconfiguration of communication interfaces including the switching between redundant interfaces, the switching of communication channels, frequency bands, and encoding and modulation settings within a specific interface; etc.).

For each resolution module, the collision management 131 implements static and dynamic resolution heuristics. Static heuristics are determined by pre-defined sets of reconfiguration actions (resolution profiles) that may be executed in a single step, with optional pre-defined sets of parameters to be evaluated (resolution profile selection criteria). Dynamic heuristics use more complex and fine-grained rules and algorithms to attempt the resolution of collisions.

In an embodiment herein, a basic static heterogeneous resolution heuristic is implemented to switch from an interface creating a collision to a redundant interface by using a pre-defined interface switching sequence (order of switching) with fixed priorities for the different network interfaces (e.g., LAN Ethernet: priority 0 (highest; default interface); LAN Wi-Fi: 1; WAN LTE: 2; WAN HSPA: 3; WAN GSM: 4 (lowest priority; emergency fallback interface).

In an embodiment herein, a basic dynamic heterogeneous resolution heuristic is implemented that switches from an interface creating a collision to a redundant interface by determining a next best interface during runtime as a function of key status and capability parameters obtained from the available communication interfaces. In another embodiment herein, dynamic heterogeneous resolution heuristics are implemented in an attempt to mitigate a collision by reconfiguring one or more interfaces in iterative steps.

Re-routing of messages may be suitable in order to avoid or reduce collisions if the collisions are not caused by one of the UE devices 54-56, or when analysis data from the UE devices 54-56 is not available. In instances where the analysis data shows that a collision detected by the controller 52 is caused by a particular one of the UE devices 54-56, the controller 52 may be configured to cause the particular one of the UE devices 54-56 to change a mode of radio operation in order to avoid or resolve the collisions. The mode of radio operation may be a mode of radio operation the one of the UE devices 54-56 uses in connection with communication with the controller 52.

The changes in the operation may be part of the module EXTRA-IF 136 and may include one or more collision avoidance (a priori collision management) and collision resolution (a posteriori collision management) mechanisms. For example, a technology migration may be used where the controller 52 cause the particular one of the UE devices 54-56 to use another communication protocol and/or technology, such as Wi-Fi, LTE, HSPA (3G), and GSM (2G). According to one embodiment, the type of communication between the particular one of the UE devices 54-56 and the controller 52 is chosen based on a priority list. That is, each of the different protocols is given a unique order number that indicates priority of each protocol. Communication between the particular one of the UE devices 54-56 and the controller 52 begins with a protocol that, based on the order number, has the highest priority. In case communication between the controller 52 and one of the managed devices 62-64 fails, communication between the controller 52 and the particular one of the UE devices 54-56 may switch to a communication protocol with a lower priority. If communication between the controller 52 and the one of the managed devices 62-64 fails again, communication between the controller 52 and the particular one of the UE devices 54-56 may switch to a communication protocol with a next lower priority, and so on. Another possible collision avoidance or resolution mechanism is to change the frequency band being used. If, for example, the particular one of the UE devices 54-56 is currently using an LTE band that possibly interferes with the frequency bands used by the controller 52 to communicate with the managed devices 62-64, the controller 52 may cause the particular one of the UE devices 54-56 to change to another LTE frequency band. Similarly, if the particular one of the UE devices 54-56 is using Wi-Fi to communicate with the controller 52 or with another device and communication between the controller 52 and one of the managed devices 62-64 fails, the controller 52 may cause the particular one of the UE device 54-56 to switch to a different frequency band within the Wi-Fi frequency spectrum.

Another possible collision avoidance or resolution mechanism is to change transmission parameters of the particular one of the UE devices 54-56. That is, the controller 52 may cause the particular one of the mobile devices 54-56 to reduce transmission rates, to use single carrier transmission instead of multicarrier transmission, or the like. It is also possible for the controller 52 to cause the particular one of the UE devices 54-56 to report transmission gaps to the controller 52. The controller 52 may then use the transmission gaps to communicate with the managed devices 62-64 coupled to the controller 52.

Note that many mobile frameworks (such as Android™) on mobile devices enable modifying the operation mode of the mobile device as set forth above. Thus, an application running on one of the UE devices 54-56 that is used to control the managed devices 62-64 via the controller 52, may also be used by the controller 52 to change operation of the one of the UE devices 54-56 when a collision caused by the one of the UE devices 54-56 has been detected. The controller 52 may be configured to re-send a message to a particular one of the managed devices 62-64 after one of the UE devices 54-56 has changed a mode of operation. The one of the UE devices 54-56 may send a confirmation message confirming a change of the mode of operation to the controller 52, which then may re-send the message to one of the managed devices 62-64.

The controller 52 may perform INTER-IF collision management using the INTER-IF module 135, described above. The INTER-IF collision management may include one of a number of collision management techniques. One collision management technique includes a technology migration where the controller 52 may internally switch from one communication protocol and/or technology to another communication protocol and/or technology. Examples of different communication protocols that may be used for communication by the controller 52 and the managed devices 62-64 include Wi-Fi, ZigBee, Z-Wave, KNX-RF, 6LoWPAN and EnOcean. For instance, if one of the managed devices supports multiple communication technologies, the controller 52 may switch between the supported communication technologies to avoid or resolve collisions.

Another collision management technique that may be used by the INTER-IF module 135 is to change the frequency band and/or channels that are being used. According to one embodiment, the type of communication between the controller 4 and the managed devices 62-64 may be modified by altering transmit parameters of the capillary networks such as utilized bands and channels if such modifications are supported by the managed devices 62-64. For example, if the controller 52 is using Wi-Fi to communicate with a particular one of the managed devices 62-64 and communication between the controller 52 and the particular one of the managed devices 62-64 fails, the controller 52 may switch to a different frequency band within the Wi-Fi frequency spectrum.

Another collision management technique is to change the transmission parameters of the controller 52 and the managed devices 62-64 where the controller 52 reduces the bandwidth of the utilized channels and creates guard-bands within given frequency bands to allow coexistence of two technologies in one given band. For example, the controller 52 may create guard bands in or adjacent to the worldwide 2.45 GHz ISM band for ZigBee, 6LoWPAN and Wi-Fi. It is also possible for the controller 52 to coordinate internal interfaces of the controller 52 to establish transmission gaps. The controller 52 may then use the transmission gaps to communicate with the managed devices 62-64 coupled to the controller 52. The controller 52 may utilize LTE or other 3GPP communication to the public cloud 59 to communicate instead of using a connection via a local Wi-Fi gateway. The controller 52 may re-schedule and/or change a priority of the transmission of messages to the managed devices 62-64 by, for example, the controller 52 detecting time gaps in which a probability of collisions is reduced, and transmitting messages to the managed devices 62-64 in the time gaps. As another collision management technique, the controller 52 may repeatedly transmit a dummy message to one of the managed devices 62-64 and may analyze the signal quality of communication with the one of the managed devices 62-64 in order to detect time gaps in which communication is more likely to be successful.

According to another embodiment, the controller 52 may be configured to use redundancy technologies and/or error correction methods in connection with communication with the managed devices 62-64. The redundancy technologies and/or error correction methods increase the robustness of communication with the managed devices 62-64. Conventional channel coding techniques such as the use of a parity bit, cyclic redundancy checks, etc., may be used to increase the robustness of the communication. The heterogeneous methods add additional techniques and methods to manage collisions in heterogeneous environments where conventional methods fail or produce suboptimal results.

Figure 7:
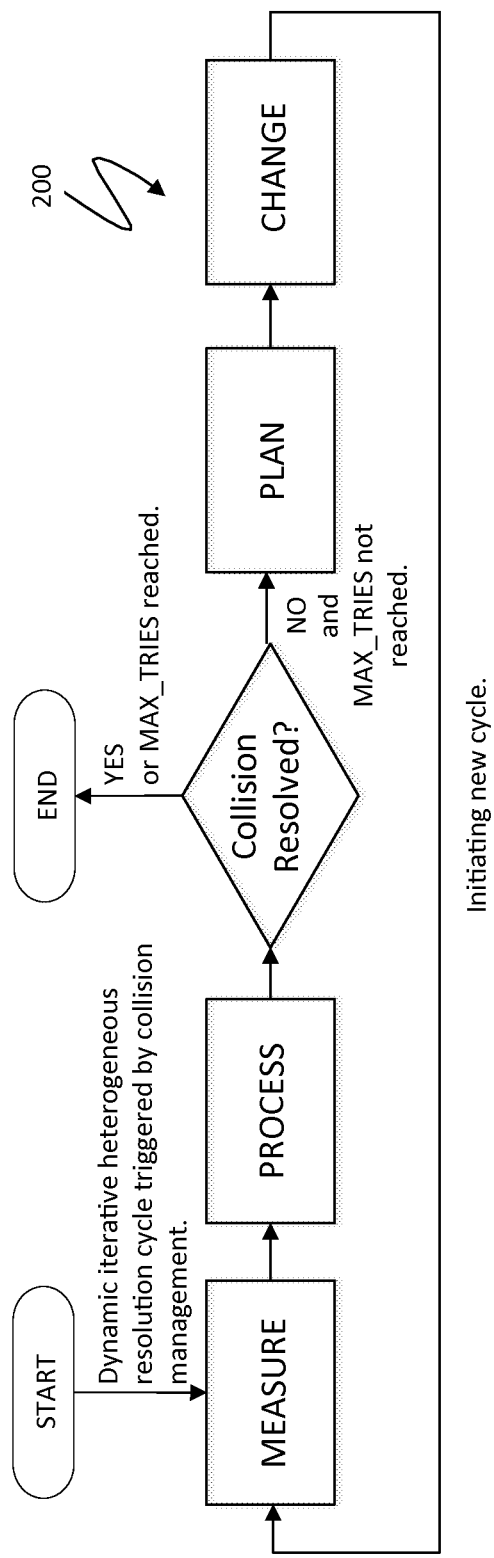
FIG. 7 is a flow diagram illustrating processing performed by collision management heuristics according to embodiments of the system described herein.

Referring to FIG. 7, a schematic diagram 200 illustrates the basic cycle of dynamic iterative heterogeneous resolution heuristics. The basic cycle includes one or more of the following steps, not necessarily in the order listed: (1) MEASURE: The measuring of relevant QoS parameters for one or more communication interfaces (e.g., identifying allocated communication channels and measuring the received signal strength indication (RSSI) values for received signals of different communication interfaces); step (1) may be an initial step when the dynamic iterative heterogeneous resolution heuristics depicted in FIG. 7 are triggered by the collision management; (2) PROCESS: The pre-processing of the measured values (e.g., transformation and normalization of RSSI values from different interfaces); (3) EVALUATION: Take a decision if the collision was resolved or if the maximum number of resolution attempts (MAX_TRIES) was reached, which results in the end of the heuristics (and the application of alternative resolution mechanisms if available and necessary), otherwise continue with next step of the heuristics; (4) PLAN: The planning of further resolution actions based on the measured values and on the history of previously performed resolution attempts (e.g., reconfiguring the channels to increase guard bands and increase transmission power for interfaces with highest demand and priority); (5) CHANGE: The application of the resolution actions and the implementation of the corresponding configuration changes to the communication interfaces; upon completion of step (5) resume with step (1) to initiate a next cycle.

In an embodiment herein, planning and changing steps of the heterogeneous resolution heuristics consider joint reconfiguration of one or more communication interfaces in order to resolve or mitigate a collision such that overall satisfactory quality-of-service is maintained. The reconfiguration may be based on static reconfiguration profiles that are predefined and preconfigured such that many collisions are resolved, and/or on dynamic reconfiguration strategies determined during runtime by measuring relevant properties of the communication interfaces (e.g., throughput, latency, signal-to-noise ratio, frequencies and bandwidth used per interface, received signal strength indicators, retransmission rate, TX to RX ratio, TX to RTX ratio, etc.) and identifying possible reconfiguration actions as a function of these parameters.

Collision management further employs both permissive and preemptive collision detection and resolution heuristics. Permissive heuristics perform an a posteriori analysis on demand once a collision has occurred. Preemptive heuristics perform a continuous a priori monitoring the status of communication interfaces and traffic, searching for signs of potential situations that may lead to collisions in the near future unless mitigated.

The collision management implements preemptive detection and resolution heuristics for attacks that include, but are not limited to, one or more of the following actions: analyzing the state information of one or more communication interfaces; analyzing messages and data exchanged by the communication interfaces; identifying one or more countermeasures to be executed on the controller and/or connected UE devices; executing countermeasures on the controller and/or on connected UE devices; evaluating the impact of the executed countermeasures on the controller and/or on connected UE devices.

Collision management persistently logs all detection events and resolution attempts for collisions and attacks. The integrity and completeness of the logging may be secured by one or more secure hardware elements that prevent unauthorized access to the events stored in the log. Note that access rights may include the right to read, write, update and delete events, for instances. If no such secure hardware is available, then the logging functionality may be restricted to an append-only mode such that only authorized system administrators may modify or remove such logs. Additional mechanisms for controlling log size may be implemented separately, such as automatic deletion of old and/or non-critical events from the log.

If collision management cannot resolve a cause or mitigate an impact of collisions with an acceptable resulting QoS, then the collision management may inform all responsible entities via pre-defined communication channels (e.g., send short text message via GSM fallback channel, etc.). The system described herein may inform one or more System Administrators, the User, or remote systems, for instance.

Referring to FIG. 8, the mapping layer 88 is shown in more detail to contain, among other components and modules, a data interpretation (INTERPRETER) 221, data routing (ROUTING) 222, and collision management (COLLISION MGT) 223 sub-modules. Data interpretation 221 and data routing 222 is executed on the controller and on connected UE devices. The interpreter 221 analyzes messages and data passing through the mapping layer 88, possibly adding, removing, or changing information in the message header and/or footer for consideration by other mapping layer 88 components. The interpreter 221 can further implement firewall and security related data monitoring and filtering mechanisms and modify control information in the headers of messages accordingly. Based on routing information stored in the message header, data routing 222 rejects, ignores, or forwards messages towards the correct communication interface or other intermediate mapping layer 220 components. In other embodiments, the routing may include additional security to protect the routing capabilities and to implement additional security means. Collision management 223 may, when executing collision resolution heuristics, interact with other components of the mapping layer 88, including the interpreter 221 and the data routing 222, as well as communication interfaces, possibly resulting in collision-specific header modifications for adjusting treatment of messages causing or affected by collisions (e.g., messages attributed to a potential attacker with a specific source address are marked as low-priority in the interpreter 221 or dropped by the routing 222, etc.).

For performance optimization and implementation of QoS guarantees (e.g., guaranteed maximum message processing and delivery times, etc.), components of the mapping layer 88 may be implemented in parts or in entire portions as accelerated modules in the operating system kernel with a more fine-grained control of execution and communication priorities.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The system described herein may be implemented with any type of electronic screen capable of being actuated by a touch screen, electromagnetic or other pen.

Note that the UE devices 54-56 may include software that is pre-loaded with the device, installed from an app store, installed from a desktop (after possibly being pre-loaded thereon), installed from media such as a CD, DVD, etc., and/or downloaded from a Web site. The smartphone may use an operating system such as iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of resolving heterogeneous communication collisions in a system, comprising:
   measuring a quality-of-service value for at least one communication connection;
   determining if a communication collision is reducing the quality-of-service value to below a pre-determined threshold; and
   if a communication collision is reducing the quality-of-service value to below a pre-determined threshold, iteratively modifying the at least one communication connection until either a maximum number of iterations has been exceeded or the quality of service value exceeds the pre-determined threshold, wherein modifying the at least one communication connection includes at least one of: changing technology used by at least one interface corresponding to the communication connection, changing a frequency band used by at least one interface corresponding to the communication connection, changing transmission parameters used by at least one interface corresponding to the communication connection, using transmission gaps to transmit data, rescheduling transmission of data, and rerouting a communication path and modifying at least one of the interfaces corresponding to the at least one communication connection and wherein the system includes electronic devices that communicate using at least one of: different protocols and different communication technologies.

2. The method, according to claim 1, wherein the technology used by at least one interface includes Wi-Fi, LTE, HSPA (3G), and GSM (2G).

3. The method, according to claim 1, wherein the technology used by at least one interface includes Wi-Fi, ZigBee, Z-Wave, KNX-RF, 6LoWPAN and EnOcean.

4. The method, according to claim 1, wherein changing transmission parameters includes one of: reducing transmission rates, switching from multicarrier transmission to single carrier transmission, and creating guard-bands within given frequency bands to allow coexistence of different technologies in one frequency band.

5. The method, according to claim 1, wherein using transmission gaps includes having a device report transmission gaps prior to using the transmission gaps.

6. The method, according to claim 1, wherein rerouting the communication path includes switching to a different type of interface.

7. The method, according to claim 6, wherein the different types of interface include a LAN Ethernet, a LAN Wi-Fi, a WAN LTE, a WAN HSPA, and a WAN GSM.

8. The method, according to claim 1, wherein the at least one communication connection uses at least one of: redundancy technologies and error correction techniques.

9. The method, according to claim 1, wherein the at least one communication connection is a connection to a mobile device.

10. The method, according to claim 1, wherein the mobile device provides control operations for the system.

11. The method, according to claim 1, wherein the at least one communication connection is connected to at least one of: a private cloud and a public cloud.

12. The method, according to claim 1, wherein the at least one communication connection is connected to an external radio device that is external to the system.

13. A non-transitory computer-readable medium containing software that resolves heterogeneous communication collisions in a system that includes electronic devices that communicate using at least one of: different protocols and different communication technologies, the software comprising:
executable code that measures a quality-of-service value for at least one communication connection;
executable code that determines if a communication collision is reducing the quality-of-service value to below a pre-determined threshold; and
executable code that iteratively modifies the at least one communication connection until either a maximum number of iterations has been exceeded or the quality of service value exceeds the pre-determined threshold if a communication collision is reducing the quality-of-service value to below a pre-determined threshold, wherein modifying the at least one communication connection includes at least one of: changing technology used by at least one interface corresponding to the communication connection, changing a frequency band used by at least one interface corresponding to the communication connection, changing transmission parameters used by at least one interface corresponding to the communication connection, using transmission gaps to transmit data, rescheduling transmission of data, and rerouting a communication path and modifying at least one of the interfaces corresponding to the at least one communication connection.

14. The non-transitory computer readable medium, according to claim 13, wherein the technology used by at least one interface includes Wi-Fi, LTE, HSPA (3G), and GSM (2G).

15. The non-transitory computer readable medium, according to claim 13, wherein the technology used by at least one interface includes Wi-Fi, ZigBee, Z-Wave, KNX-RF, 6LoWPAN and EnOcean.

16. The non-transitory computer readable medium, according to claim 13, wherein changing transmission parameters includes one of: reducing transmission rates, switching from multicarrier transmission to single carrier transmission, and creating guard-bands within given frequency bands to allow coexistence of different technologies in one frequency band.

17. The non-transitory computer readable medium, according to claim 13, wherein using transmission gaps includes having a device report transmission gaps prior to using the transmission gaps.

18. The non-transitory computer readable medium, according to claim 13, wherein rerouting the communication path includes switching to a different type of interface.

19. The non-transitory computer readable medium, according to claim 18, wherein the different types of interface include a LAN Ethernet, a LAN Wi-Fi, a WAN LTE, a WAN HSPA, and a WAN GSM.

20. The non-transitory computer readable medium, according to claim 13, wherein the at least one communication connection uses at least one of: redundancy technologies and error correction techniques.

21. The non-transitory computer readable medium, according to claim 13, wherein the at least one communication connection is a connection to a mobile device.

22. The non-transitory computer readable medium, according to claim 13, wherein the mobile device provides control operations for the system.

23. The non-transitory computer readable medium, according to claim 13, wherein the at least one communication connection is connected to at least one of: a private cloud and a public cloud.

24. The non-transitory computer readable medium, according to claim 13, wherein the at least one communication connection is connected to an external radio device that is external to the system.

* * * * *